Dec. 9, 1930. G. W. ALDEEN 1,783,993
PULLEY
Filed April 19, 1928

Inventor
Gedor W. Aldeen
By Chindahl Parker Carlson
Attys

Patented Dec. 9, 1930

1,783,993

UNITED STATES PATENT OFFICE

GEDOR W. ALDEEN, OF ROCKFORD, ILLINOIS

PULLEY

Application filed April 19, 1928. Serial No. 271,390.

The invention relates generally to pulleys and more particularly to pulleys formed from sheet metal stampings.

Pulleys of this general character are usually formed from two sheet metal stampings which are fastened together by suitable means to form a stiff central web with an annular groove formed at its outer peripheral edge to receive a cable or chain.

The general object of the invention is to provide a pulley of this character which is simple, strong, durable and relatively inexpensive. More specifically the object is to provide such a pulley comprising a minimum number of individual parts which are adapted to be produced by a minimum number of high speed production operations.

Another object is to provide such a pulley comprising duplicate opposed sections positively secured together at a plurality of angularly spaced points by a single securing or fastening member.

Another object is to provide a pulley having two sections secured together by a fastening member which acts wholly in shear to resist separation of the two sections.

Other objects and advantages will become apparent from the following description taken in connection with the accompanying drawings in which.

Figure 1:
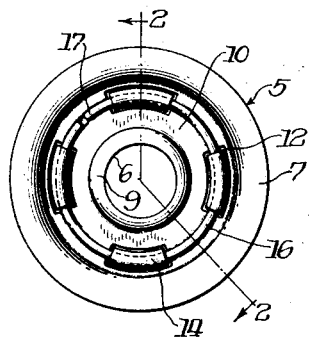
Figure 1 is a side elevational view of a pulley embodying the preferred form of the invention.
Figure 2:
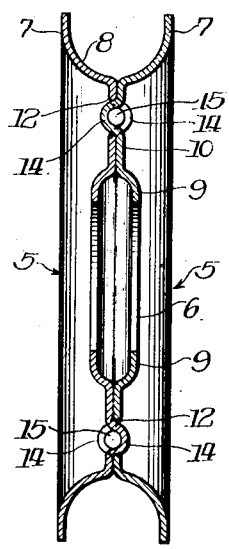
Fig. 2 is a sectional view taken along the line 2—2 of Fig. 1, the locking member 16 being removed.
Figure 3:
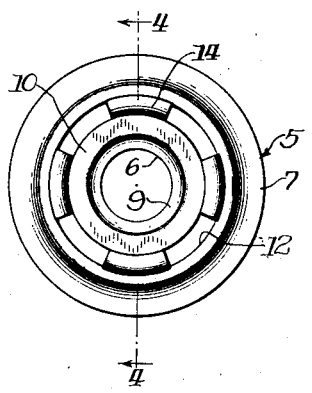
Fig. 3 is an elevational view of the inner side of one of the sections of the pulley shown in Fig. 1.
Figure 4:
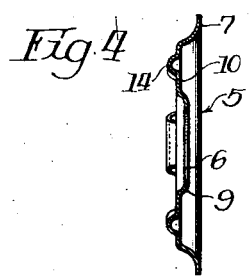
Fig. 4 is a sectional view taken along the line 4—4 in Fig. 3.
Figure 5:
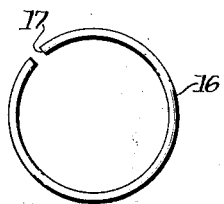
Fig. 5 is an elevational view of the locking member.

For purposes of disclosure there is illustrated in the drawings and will hereinafter be described in detail the preferred embodiment of the invention, with the understanding that it is not intended to limit the invention to the particular construction and arrangement shown, it being contemplated that various changes may be made by those skilled in the art without departing from the spirit and scope of the appended claims.

In the preferred embodiment chosen for disclosure herein the pulley is formed from sheet metal and comprises two opposed duplicate sections 5 each section having a central aperture 6 formed therein to receive any suitable form of bushing or hub (not shown). At its outer peripheral edge each section 5 is formed with a laterally projecting annular flange 7 which is preferably of arcuate cross section so that when the two sections are placed in assembled relation, the two flanges will form a semi-circular annular groove 8 to receive a cable or chain (not shown). Preferably the inner edge of the sections is also formed with an annular flange 9 projecting laterally in the same direction as the outer flange 7, thus providing laterally spaced points of bearing in the finished pulley to receive a hub structure (not shown) and to maintain such a hub structure in rigid relation with the other parts of the pulley.

The portion of each section lying between the outer flange 7 and the inner flange 9 forms a central web 10 and in the assembled pulley the web portions 10 of the two sections lie in close lateral relation to each other.

Means is provided for securing the two sections 5 of the pulley in assembled relation, and in its preferred form this means is positioned in the web portion 10 adjacent the outer edge thereof. In the form herein shown, a plurality of annularly spaced apertures 12 are formed in the web section 10 and intermediate these apertures the metal of the web is struck laterally to provide a plurality of engaging members or loops 14 which project laterally from the web 10 in the opposite direction from the flanges 7 and 9. The loops 14 and the apertures 12 are preferably of substantially the same arcuate length so that when the two sections 5 are placed in opposed relation, the loops 14 of each section will project through the apertures 12 in the other section and the ends of the loops will fit snugly against the ends of the apertures to prevent relative rotative movement of the sections.

In Figure 1 of the drawings this space between the ends of the loops 14 and the ends of the apertures 12 has been magnified so as to show clearly that the loops 14 which are shown are not a part of the section in which the apertures are shown.

The loops 14 are preferably arranged so as to project through the apertures 12 a sufficient distance to provide a continuous annular passage 15 centered transversely of the pulley and adapted to receive locking means projecting through the loops in one section and bearing against the side of the other section at the edges of the apertures. Preferably this locking means comprises a single annular locking member 16 which extends through all of the loops 14 to secure the sections 5 in assembled relation. The locking member 16 is preferably formed from steel wire which is resilient and when the wire has been inserted through all of the loops, this resiliency causes the ends 17 of the wire to spring laterally into the groove formed by the inner side by one of the loops 14. Thus the locking member is fixed against accidental displacement and the ends thereof are positioned so that they will not catch on objects during the rotation of the pulley.

While in the embodiment described herein the metal displaced in forming the apertures 12 is entirely severed from the section, it is to be understood that such complete severance of the metal is not essential, and that the metal displaced to form the apertures 12 may be struck laterally in the direction opposite from the loops 14 so that each section 5 has an annular series of loops alternately projecting in opposite directions. The use of a single locking member 16 is advantageous since the two sections 5 may be placed in assembled relation and secured together by the one simple operation of threading the locking member 16 through the passage 15.

It will be noted that the force tending to separate the two sections 5, exerts a shearing action on the locking member 16 at each end of each loop 14. It will also be noted that during the assembling operation of the pulley it is not necessary to bend or upset materially any of the parts of the pulley. This last mentioned feature is particularly advantageous when the pulley is made from metal which has a rust-resisting coating since it eliminates the possibility of cracking this coating during the assembling operation.

From the foregoing description it will be apparent that the invention provides a pulley composed of a minimum number of structurally simple parts, each of which may be economically formed, and that the individual parts may be cheaply assembled to form an economical, rugged and durable pulley.

I claim as my invention:

1. A sheet metal pulley comprising a pair of duplicate sections each formed to provide a central web portion and an outer flange projecting laterally from the outer side of said web, said web having a plurality of annularly arranged spaced apertures and a plurality of annularly spaced loops intermediate said apertures and projecting laterally from said web in the opposite direction from said flange, said loops in each section being arranged to project through the apertures in the opposite section to provide a continuous annular passage centered laterally of said web, and an annular locking member extending through said passage to secure said sections together.

2. A sheet metal pulley comprising, in combination, a pair of similar opposed members forming the web and flanges of the pulley, each of said members having an annular series of alternate apertures and laterally projecting loops, the loops in one section projecting through the apertures in the opposed section, and a single annular fastening member passing through all of said loops to secure said sections in assembled relation.

3. A sheet metal pulley comprising, in combination, a pair of similar opposed members forming the web and annular groove of the pulley, each of said members having an annular series of alternate apertures and laterally projecting loops, the loops in each section projecting through the apertures in the other section, and means projecting through said loops to lock said members in assembled relation.

4. A pulley comprising, in combination, a pair of opposed sections, one having a plurality of apertures formed therein and the other having a plurality of loops projecting laterally therefrom through the apertures in said first mentioned section, and locking means extending through said loops to secure the two sections together.

5. A pulley comprising a pair of opposed sections, one having an aperture formed therein and the other having a loop projecting laterally therefrom through the aperture in the first mentioned section, and a locking member projecting through said loop so as to secure the two sections in assembled relation.

6. A pulley comprising, in combination, a pair of opposed sections forming the web and rim of the pulley, and a single means securing said sections together adjacent to said rim and arranged so that in order to separate the sections during use, said means must be sheared apart at a plurality of points spaced circumferentially of said web.

7. A pulley comprising, in combination, a pair of opposed sections forming the web and rim of the pulley, and a single fastening means acting in shear at a plurality of circumferentially spaced points to resist separation of said sections.

8. A sheet metal pulley comprising, in combination, a pair of sections positioned in opposing relation to form the web and rim of the pulley, and a single annular locking member engaging each of said sections at a plurality of circumferentially spaced points to secure said sections positively together.

9. A pulley comprising, in combination, a section having an aperture formed therein, a member extending across said aperture and bearing against the side of said section at the edges of said aperture, a second section positioned in opposed relation to said first section on the side opposite from said member, and a portion struck from said second section extending through said aperture past said member and bearing against the far side of said member.

10. A pulley comprising, in combination, a section having an aperture formed therein, a locking member extending across said aperture and bearing against the side of said section at the edges of said aperture, a second section positioned in opposed relation to said first section on the side opposite from said member, and means on said second section projecting through the aperture in said first section and engaging said locking member to secure said sections in assembled relation.

11. A sheet metal pulley comprising, in combination, a pair of sections positioned in opposing relation and cooperating to form the web and rim of the pulley, and a single locking member engaging each of said sections at a plurality of circumferentially spaced points to secure said sections in assembled relation.

12. A sheet metal pulley comprising, in combination, a pair of sections positioned in opposing relation and cooperating to form the web and rim of the pulley, and a locking member engaging each of said sections at a plurality of spaced points to secure said sections in assembled relation.

13. A sheet metal pulley comprising, in combination, a pair of sections positioned with their inner side surfaces in abutting relation to each other so that the two sections form the web and rim of the pulley, and a locking member extending circumferentially about said pulley and engaging alternately the outer surfaces of the two sections at circumferentially spaced points to secure said sections in assembled relation.

In testimony whereof, I have hereunto affixed my signature.

GEDOR W. ALDEEN.